Nov. 21, 1933.　　J. O. GETTE, JR　　1,935,740
AEROPLANE INSTRUMENT
Filed Dec. 1, 1930　　3 Sheets-Sheet 1

INVENTOR
JOHN O. GETTE JR.
BY
ATTORNEYS

Nov. 21, 1933.  J. O. GETTE, JR  1,935,740
AEROPLANE INSTRUMENT
Filed Dec. 1, 1930  3 Sheets-Sheet 2

INVENTOR
JOHN O. GETTE JR.
BY
ATTORNEYS

Nov. 21, 1933.  J. O. GETTE, JR  1,935,740
AEROPLANE INSTRUMENT
Filed Dec. 1, 1930  3 Sheets-Sheet 3

INVENTOR
JOHN O. GETTE JR.
BY
ATTORNEYS

Patented Nov. 21, 1933

1,935,740

UNITED STATES PATENT OFFICE 1,935,740

AEROPLANE INSTRUMENT

John O. Gette, Jr., Yonkers, N. Y., assignor to Pioneer Instrument Company, Incorporated, Brooklyn, N. Y., a corporation of New York Application December 1, 1930. Serial No. 499,191

3 Claims. (Cl. 33—215)

This invention relates to position flying instruments for aeroplanes.

One object of the invention is a simplified unitary instrument giving at a single observation the bank, turn and rate of climb indications whereby the pilot may by simply observing one single instrument know whether his machine is at the proper attitude for safe flying. A further object of the invention is a novel and improved bank indicating means. A further object of the invention is a novel and improved turn indicating means. A further object of the invention is a novel and improved rate of climb indicating means. A still further object of the invention is an instrument of the above indicated character which is characterized by its simplicity in construction and operation, its compactness and its reliability and dependability in service.

For a better understanding of the invention reference may be had to the accompanying drawings forming a part of this application wherein.

Figure 1:
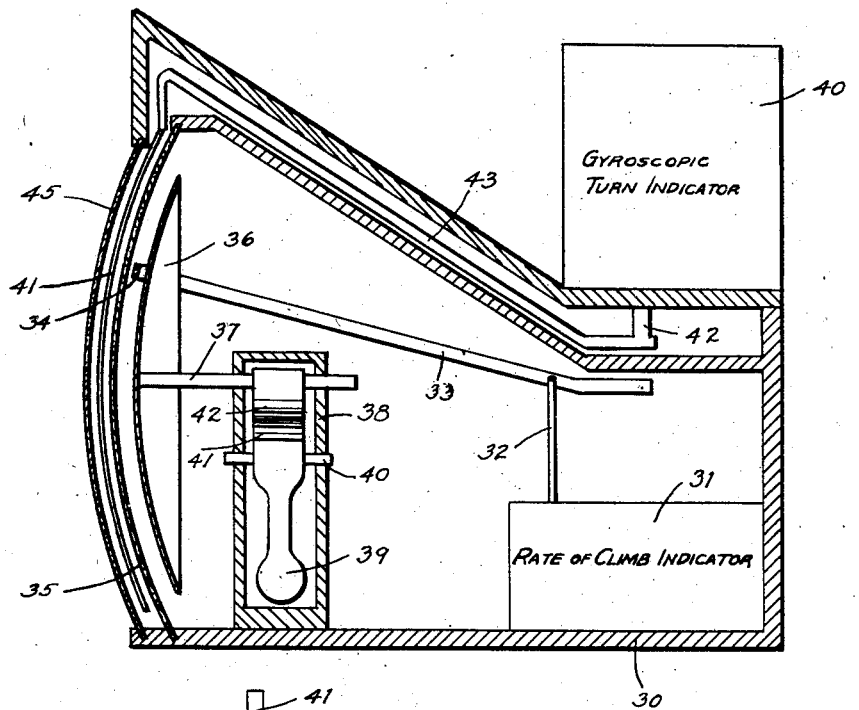
Fig. 1 is a sectional view more or less diagrammatic of an instrument embodying the invention.
Figure 2:
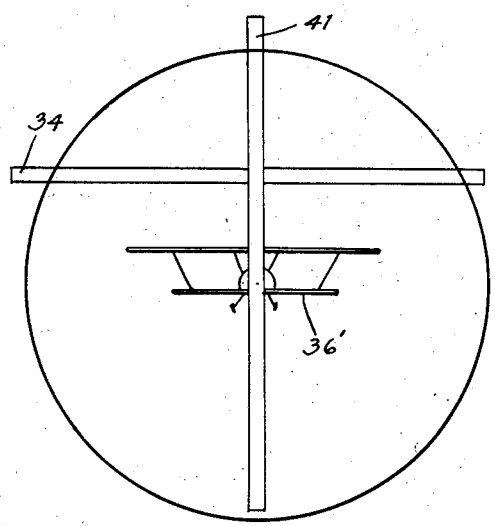
Fig. 2 is a front view of the dial thereof.
Figure 3:
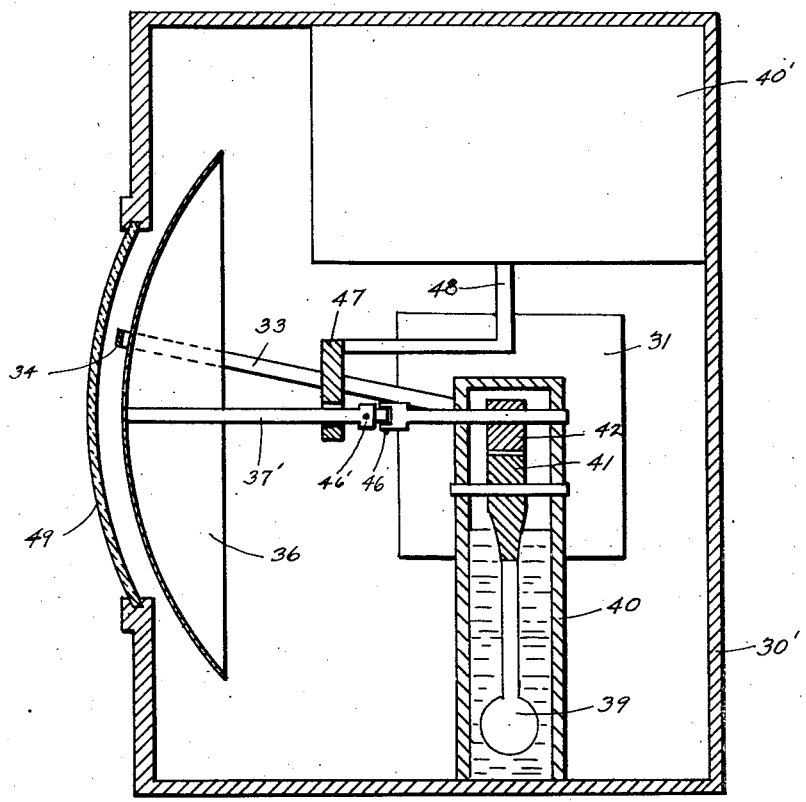
Fig. 3 is a sectional and more or less diagrammatic view of a modified form of the invention.

The instrument may be mounted in any suitable part of the aeroplane, as for example adjacent to, or partly upon or wholly upon the usual instrument board, the mounting being omitted for convenience in illustration. Referring to Figs. 1 and 2 the instrument includes a casing 30 containing a rate of climb actuating means 31, the latter operating through the connections 32 and 33 and a horizontal reference line or member 34. The casing 30 is preferably airtight and has a glass window 35 through which the position of the horizontal line or member 34 may be observed. There is also disposed within the casing 30 a bank indicating means including a dial member 36 rotatably mounted by means of a shaft 37 upon the axis of the shaft, this shaft being journalled in any suitable manner in the support or casing 38. A pendulum 39 carried by a shaft 40, which is journalled in any suitable manner in the casing 38, is capable of relative lateral oscillating movements within the casing and carries a segmental gear 41 meshing with a similar segmental gear 42 upon the shaft 37 for transmitting rotary movements to the shaft 37 corresponding to the lateral inclination or rolling movements of the aeroplane. Means, as for example in the form of a liquid as shown in Fig. 3, may be introduced into the casing 38 to dampen the relative lateral movements of the pendulum. The dial 36 is preferably in the form of a spherical segment and the horizontal reference line or member 34, which is actuated by the rate of climb indicator 31, is preferably curved to conform to the spherical segment. The dial window 35 is similarly preferably spherical in shape to correspond to the spherical segment 36, the horizontal hand or reference line 34 moving between the spherical segment 36 and the window 35. The spherical segment has marked thereon in the approximate center thereof an aeroplane 36' as the reference object of the spherical segment, although any other suitable reference means may be used. The turn indicating means includes a gyroscopic turn actuator 40 and a vertical hand or reference line 41 which is actuated by the gyroscope 40. This vertical hand or reference member 41 is disposed closely adjacent the dial window 35 and is curved correspondingly to the spherical shape of the latter. The turn indicating means is preferably mounted outside of the casing 30 as indicated in the drawings, the gyroscope 40 being supported in any suitable manner upon or attached to the casing 30. The gyroscopic actuator operates the vertical hand 41 through the diagrammatically indicated means 42 and 43 to cause the hand or reference line 41 to swing laterally across the instrument dial face. The spherical shaped window 45 is mounted just forward of the vertical hand 41, the latter being movable back and forth between the two spherical shaped and transparent windows 35 and 45. The turn indicating means are mounted externally of the airtight casing 30 and, therefore, the gyroscope can be a wind driven gyroscope or any other character of drive desired may be employed. The spherical disc or segment 36 may be of translucent material and a source of light may be disposed behind the same for indirect illumination, the latter being omitted for convenience in illustration because, in this embodiment, such illumination is not essential to the invention as it is in the embodiment shown in Fig. 4.

The operation of the instrument is clear from the above description. The pilot need make only one glance or observation to ascertain the correctness of the bank, the turn and the rate climb, the instrument correctly indicating the safe or unsafe condition at the moment. The pendulum operated bank indicator, the rate of turn and rate of climb means are thus correlated and brought together in a markedly simple and effective manner to give the three indications in a single instrument and at one observation.

In the modification of Fig. 3 the spherical segment 36, having thereon a reference object 36', is not only mounted for rotary movement about the axis of a shaft 37', but is also movable laterally by means of the gyroscopic turn actuator 40'. For example the shaft 37' is provided with a knuckle joint 46 for a vertical pivotal axis, and operative connections 47, 48 between the gyroscope and the shaft 37' are diagrammatically illustrated for giving to the spherical segment 36 the lateral or turn indicating movements about the pivotal axis 46. The shaft 37' is indicated as passing through an opening in the operative connection 47. The shaft is provided with a second knuckle joint 46' and the two joints 46, 46' form a universal joint in the power shaft. By means of this universal power transmitting joint the bank or rolling movements of the craft are transmitted to the spherical segment 36 through the medium of the pendulum 39 and the segmental gears 41 and 42, which are interposed between the pendulum and the shaft to provide for the proper directional rotation for oscillation of the spherical segment 36. The rate of climb indicator 31 may be similar to that of Fig. 1 and it actuates through the link connection 33 and the horizontal hand or indicating member which is curved correspondingly to the spherical form of the segment 36. A glass front-piece 49 is sealed in the casing 30 or completely encloses the instrument to make it airtight which is desirable in the operation of the rate of climb indicator employed. Electrically driven gyroscopes are preferable because of the facility with which the interior of the casing may be entirely enclosed and sealed. On the glass front-piece 49 a vertical reference line is marked with suitable other vertical lines to indicate the rate of turn, as for example in Fig. 5. If desired, of course, suitable horizontal reference lines may also be formed on the front glass-piece.

Figure 4:
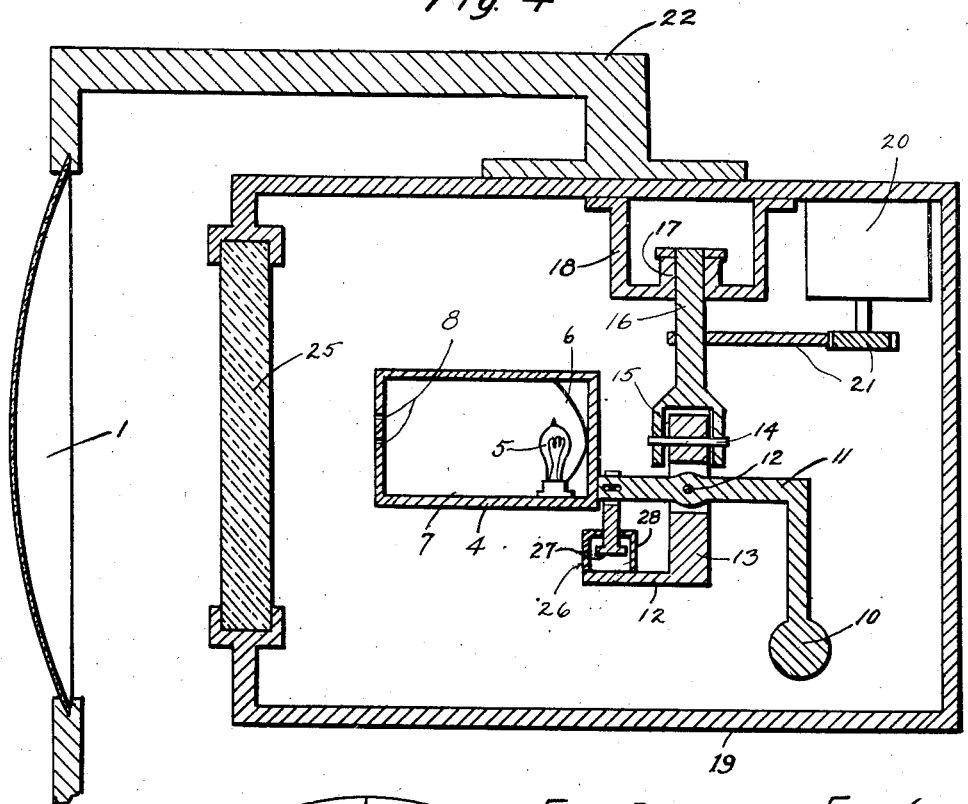
Fig. 4 is a sectional and partly diagrammatic view of an instrument showing another modification.
Figure 5:
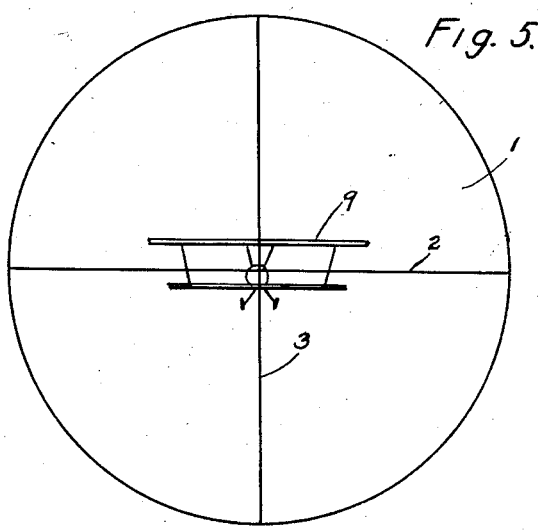
Fig. 5 is a view of the dial thereof.
Figure 6:
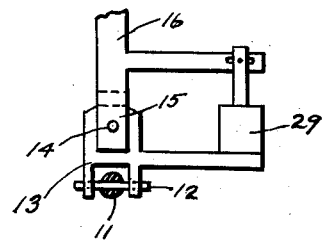
Fig. 6 is a view of a detail.

The third modification of the instrument is shown in Figs. 4, 5 and 6. The instrument includes a dial or screen 1, as for example of ground glass, which is mounted in the instrument panel of the aeroplane and this dial is provided with a pair of perpendicular lines 2 and 3 with reference to which a projected image of an aeroplane or other device simulating the craft in flight is compared to determine and show at a glance to the pilot the real attitude of the craft.

The instrument also includes a projector 4 having a light source 5 and a reflector 6 this projector being mounted to assume attitudes corresponding to those of the craft in flight and having an enclosing casing 7 with slots or other means 8 in its forward end to enable the projector to project upon the screen 1 its attitude. In the particular embodiment shown the slots 8 are adapted to form a device simulating an aeroplane 9 to be projected upon the screen. The projector is rigidly connected with a pendulum 10 and the two as a unit are mounted for universal movements. For example a horizontal arm 11 rigidly connects the two parts together and this arm is pivoted for rocking movements in vertical planes about a pivotal axis 12 upon a member 13 which in turn is pivotally mounted on a pivotal axis 14 between the fingers of a fork 15 for movements in transverse planes. The fork 15 forms a part of a vertical shaft 16, the latter being journalled at 17 in a casing or bracket 18 carried on the interior of a casing 19 housing the movable parts of the instrument. At 20 I have indicated a gyroscope or similar means for imparting to the shaft 16 rotary movements corresponding to the rate of turning movements of the craft, and at 21 I have indicated gearing means between the device 20 and the shaft 16. The casing 19 may be carried by any suitable part of the aeroplane framework indicated for example at 22.

Pitching or banking movements of the craft are indicated upon the dial 1 by the shifting of the projected view or image 9 relatively to the two cross lines 2 and 3. The gyroscope 20 or similar device causes the indication of turning movements. In making a turn the gyroscope or inductor compass swings the projector about its vertical axis 16 displacing the image 9 in a horizontal direction while the universally mounted projector and pendulum will give an indication as to whether the proper bank is being maintained. If the proper bank is maintained during the turn the aeroplane image will be parallel to the horizontal cross line on the screen. If it is not parallel the controls are moved normally to bring the image parallel. For level straight flight the image is always kept at the intersection of the cross lines parallel to the horizontal or line 2. To fly an aeroplane with this instrument installed the pilot need only to keep the image parallel to the horizontal. For straight flight the image is kept at the intersection and during turns the image is moved either left or right depending on the direction of the desired turn. For ascending or descending the pilot keeps the image 9 above or below the line 2. The indicating means, therefore, for all flying conditions is provided in one single unit so that the pilot is not required to divide his attention among several different instruments and, moreover, by means of the particular arrangement shown a realistic picture of the craft attitude at all times is before the pilot, thereby requiring no special instruction as to how it is to be used.

At 25 I have shown a lens between the projector and the screen consisting of a cylindrical lens for the purpose of reversing the motion of the image in rotation about its longitudinal axis. By using this lens the image rotates in the proper direction so that no reversal of the controls is necessary to correct for an improper attitude of the aeroplane.

At 26 I have indicated diagrammatically a damping device for preventing undue oscillations of the universally mounted projector. This damping device may consist of any suitable means, as for example a piston 27 moving in a cylinder 28 containing a liquid, the piston having a small hole in it or passage around it for the passage of liquid from one side of the piston to the other. The device 26 is connected between the member 13 and the arm 11 to damp the movements in vertical longitudinal planes. A similar device 29 is connected between the shaft 16 and the member 13 (Fig. 6) to damp the movements in transverse planes. It is understood that any suitable damping means may be provided in the place of the devices shown.

The rate of climb indicating means shown in Figs. 1 to 3 may be of any suitable equipment, such for example as a differential pressure rate of climb indicator. In some instances it may be sufficient to provide in the place of the rate of climb indicator a pitch indicator, as for example a gyroscope of the stabilizer type and in this case the horizontal reference line indicates pitch instead of rate of climb. If desired, means for indicating the course deviation may be provided and positioned adjacent to or in front of the instrument to indicate course deviation. Also in some instances it may be sufficient to provide in the place of the means for indicating the rate of turn an earth inductor compass indicating the turning of the craft.

I claim:

1. In an aircraft position instrument means responsive to the rolling of the craft including a segmental dial operated thereby, means responsive to the turning of the craft about a vertical axis including a movable vertical reference member cooperating with said segmental dial, and means responsive to the pitching or rate of climb of the craft including a horizontal movable reference member cooperating with said vertical reference member and said segmental dial in the same field of view of the instrument.

2. In an aircraft position instrument the combination of means responsive to the rolling of the craft including a segmental dial rotatable thereby about an axis parallel to the longitudinal axis of the craft, means responsive to the turning of the craft about a vertical axis and including a vertical reference member movable in azimuth over said segmental dial, and means responsive to the pitching of the craft and including a horizontal reference member movable vertically over said segmental dial and cooperating with the latter and with the vertical reference member to indicate the attitude of the craft about its three axes in a single field of view.

3. In an aircraft position instrument, the combination of means responsive to the rolling of the craft including a dial rotatable thereby about an axis parallel to the longitudinal axis of the craft, means responsive to the turning of the craft about a vertical axis including a vertical reference member movable in azimuth over said dial, and means responsive to the pitching of the craft including a horizontal reference member movable vertically over said dial and cooperating with the latter and with the vertical reference member to indicate the attitude of the craft about its three axes.

JOHN O. GETTE, Jr.